US010001946B2

(12) United States Patent
Bonwick

(10) Patent No.: US 10,001,946 B2
(45) Date of Patent: *Jun. 19, 2018

(54) METHOD AND SYSTEM FOR GARBAGE COLLECTION IN A STORAGE SYSTEM BASED ON LONGEVITY OF STORED DATA

(71) Applicant: EMC IP Holding Company LLC, Hopkinton, MA (US)

(72) Inventor: Jeffrey S. Bonwick, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/426,295

(22) Filed: Feb. 7, 2017

(65) Prior Publication Data

US 2017/0147257 A1  May 25, 2017

Related U.S. Application Data

(63) Continuation of application No. 14/473,325, filed on Aug. 29, 2014, now Pat. No. 9,600,409.

(51) Int. Cl.
*G06F 3/06* (2006.01)

(52) U.S. Cl.
CPC .......... *G06F 3/0652* (2013.01); *G06F 3/0608* (2013.01); *G06F 3/0641* (2013.01);
(Continued)

(58) Field of Classification Search
CPC ............. G06F 12/0246; G06F 12/0253; G06F 3/0641; G06F 3/0646; G06F 3/0647
(Continued)

(56) References Cited

U.S. PATENT DOCUMENTS 9,600,409 B2 * 3/2017 Bonwick ............... G06F 3/0604
2010/0325351 A1* 12/2010 Bennett ............... G06F 12/0246
711/103
(Continued)

FOREIGN PATENT DOCUMENTS

JP       2007004506 A    1/2007
JP       2013029879 A    2/2013
WO       2010144587 A2   12/2010

OTHER PUBLICATIONS

Extended European Search report corresponding European application No. 15182784.7 dated Dec. 4, 2015 (6 pages).
(Continued)

*Primary Examiner* — Than Nguyen
(74) *Attorney, Agent, or Firm* — Chamberlain Hrdlicka

(57) ABSTRACT

A method for managing data. The method includes receiving a first request to write data to persistent storage and in response to the first request, writing the data to a short-lived block in the persistent storage, where the data is short-lived data or data of unknown longevity. The method further includes performing a modified garbage collection operation that includes: selecting a first frag page in a first block, determining that the first frag page is live, and migrating, based on the determination that the first frag page is live, the first frag page to a long-lived block in the persistent storage, where the long-lived block is distinct from the short-lived block and wherein the long-lived block does not include any short-lived data.

20 Claims, 10 Drawing Sheets

(52) U.S. Cl.
CPC .......... *G06F 3/0647* (2013.01); *G06F 3/0649* (2013.01); *G06F 3/0688* (2013.01)

(58) Field of Classification Search
USPC ................................. 711/103, 155; 707/813
See application file for complete search history.

(56) References Cited

U.S. PATENT DOCUMENTS

| | | |
|---|---|---|
| 2013/0097369 A1 | 4/2013 | Talagala et al. |
| 2015/0268989 A1 | 9/2015 | Busch et al. |

OTHER PUBLICATIONS

Office Action in corresponding Japanese application No. 2015-168994 dated Sep. 20, 2016 (11 pages).

* cited by examiner

METHOD AND SYSTEM FOR GARBAGE COLLECTION IN A STORAGE SYSTEM BASED ON LONGEVITY OF STORED DATA

BACKGROUND

In a storage system, it is often the case that to write one block of data, on average half a block of data requires migration. As a result, writing data to the storage system introduces significant latency in the system and, consequently, reduces the overall performance of the system. In order to manage data in a storage system, a garbage collector is typically used to reclaim memory from data that is no longer in use.

SUMMARY

In general, in one aspect, the invention relates to a non-transitory computer readable medium comprising instructions, which when executed by a processor perform a method, the method including receiving a first request to write data to persistent storage, in response to the first request, writing the data to a short-lived block in the persistent storage, where the data is short-lived data, and performing a modified garbage collection operation including selecting a first frag page in a first block, determining that the first frag page is live, migrating, based on the determination that the first frag page is live, the first frag page to a long-lived block in the persistent storage, where the long-lived block is distinct from the short-lived block and wherein the long-lived block does not include any short-lived data.

In general, in one aspect, the invention relates to a method for managing data. The method includes receiving a first request to write data to persistent storage, in response to the first request, writing the data to a short-lived block in the persistent storage, wherein the data is one selected from a group consisting of short-lived data and data of unknown longevity, and performing a modified garbage collection operation that includes: selecting a first frag page in a first block, determining that the first frag page is live, migrating, based on the determination that the first frag page is live, the first frag page to a long-lived block in the persistent storage, where the long-lived block is distinct from the short-lived block and wherein the long-lived block does not include any short-lived data.

In general, in one aspect, the invention relates to a storage appliance, including persistent storage, a non-transitory computer readable medium comprising instructions and a processor, configured to execute the instructions, where the instructions when executed by the processor perform the method. The method includes (a) receiving a first request to write data to the persistent storage, (b) in response to the first request, writing the data to a short-lived block in the persistent storage, wherein the data is one selected from a group consisting of short-lived data and data of unknown longevity, and (c) performing a modified garbage collection operation comprising: selecting a first frag page in a first block, determining that the first frag page is live, migrating, based on the determination that the first frag page is live, the first frag page to a long-lived block in the persistent storage, wherein the long-lived block is distinct from the short-lived block and wherein the long-lived block does not include any short-lived data, wherein at least a portion of the modified garbage collection operation is performed in parallel with at least one selected from a group consisting of (a) and (b).

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description In the following description of FIGS. 1-6B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system in which longevity of data is used to sort the data within or written to a storage appliance. Specifically, embodiments of the invention relate to storing data that is persistent separately from data that is short-lived. By sorting data based on longevity, write amplitude in the storage appliance may be decreased in accordance with one or more embodiments of the invention. In one or more embodiments of the invention, write amplitude corresponds to the number of migrations of data in the storage appliance required for each write to the storage appliance. Because the number of program/erase cycles may decrease the lifetime of a solid state memory module, there is a performance benefit by decreasing the write amplitude.

Figure 1:
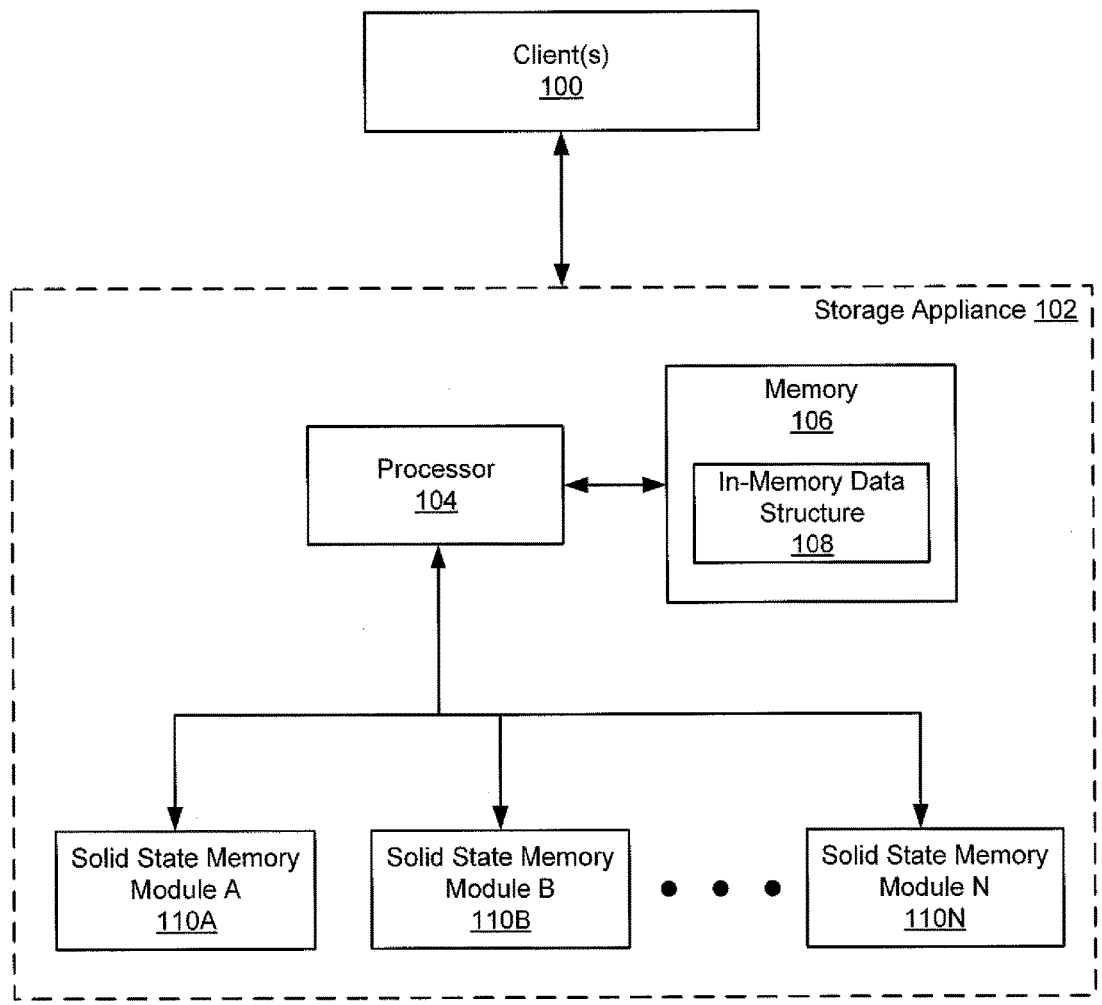
FIG. 1 shows a system in accordance with one or more embodiments of the invention.

FIG. 1 shows a system in accordance with one embodiment of the invention. As shown in FIG. 1, the system includes one or more clients (100) and a storage appliance (102). Each of these components is described below.

In one or more embodiments of the invention, a client (100) is any system or process executing on a system that includes functionality to issue a read request to the storage appliance (102) and/or issue a write request to the storage appliance. In one or more embodiments of the invention, the clients (100) may each include a processor (not shown), memory (not shown), and persistent storage (not shown).

In one or more embodiments of the invention, a client (100) is operatively connected to the storage appliance (102). In one or more embodiments of the invention, the storage appliance (102) is a system that includes volatile and persistent storage and is configured to service read requests and/or write requests from one or more clients (100). The storage appliance (102) further is configured to implement the modified garbage collection operation, which includes migrating any table of contents (TOC) entries and frags to a long-lived block in a manner consistent with the modified garbage collection operation described below (see e.g., FIG. 4). The storage appliance (102) is further configured to store data from write requests in the storage appliance in a manner consistent with the method described below (see e.g., FIG. 3).

In one or more embodiments of the invention, the storage appliance (102) includes a processor (104), memory (106), and one or more solid state memory modules (e.g., solid state memory module A (110A), solid state memory module B (110B), solid state memory module N (110N)).

In one or more embodiments of the invention, memory (106) may be any volatile memory including, but not limited to, Dynamic Random-Access Memory (DRAM), Synchronous DRAM, SDR SDRAM, and DDR SDRAM. In one or more embodiments of the invention, memory (106) is configured to temporarily store various data (including data for TOC entries and frags) prior to such data being stored in a solid state memory module (e.g., 110A, 110B,110N). Memory (106) is operatively connected to the processor (104).

In one or more embodiments of the invention, the processor (104) is a group of electronic circuits with a single core or multi-cores that are configured to execute instructions. The processor (104) is configured to execute instructions to implement one or more embodiments of the invention, where the instructions are stored on a non-transitory computer readable medium (not shown) that is located within or that is operatively connected to the storage appliance (102). Alternatively, the storage appliance (102) may be implemented using hardware. The storage appliance (102) may be implemented using any combination of software and/or hardware without departing from the invention.

In one or more embodiments of the invention, the storage appliance (102) is configured to create and update an in-memory data structure (108), where the in-memory data structure is stored in the memory (106). In one or more embodiments of the invention, the in-memory data structure includes mappings (direct or indirect) between logical addresses and physical addresses. In one or more embodiments of the invention, the logical address is an address at which the data appears to reside from the perspective of the client (100). In one or more embodiments of the invention, the logical address is (or includes) a hash value generated by applying a hash function (e.g., SHA-1, MD-5, etc.) to an n-tuple. In one or more embodiments of the invention, the n-tuple is <object ID, offset ID>, where the object ID defines an object (e.g. file) and the offset ID defines a location relative to the starting address of the object. In another embodiment of the invention, the n-tuple is <object ID, offset ID, birth time>, where the birth time corresponds to the time when the file (identified using the object ID) was created. Alternatively, the logical address may include a logical object ID and a logical byte address, or a logical object ID and a logical address offset. In another embodiment of the invention, the logical address includes an object ID and an offset ID. Those skilled in the art will appreciate that multiple logical addresses may be mapped to a single physical address and that the logical address is not limited to the above embodiments.

In one or more embodiments of the invention, the physical address may correspond to a location in the memory (106) or a location in a solid state memory module (e.g., 110A, 110B, 110N). In one or more embodiments of the invention, the in-memory data structure may map a single hash value to multiple physical addresses if there are multiple copies of the data in the storage appliance (102).

In one or more embodiments of the invention, the solid state memory modules (e.g., 110A, 110B,110N) correspond to any data storage device that uses solid-state memory to store persistent data. In one or more embodiments of the invention, solid-state memory may include, but is not limited to, NAND Flash memory, NOR Flash memory, Magnetic RAM Memory (M-RAM), Spin Torque Magnetic RAM Memory (ST-MRAM), Phase Change Memory (PCM), or any other memory defined as a non-volatile Storage Class Memory (SCM).

Those skilled in the art will appreciate that the invention is not limited to the configuration shown in FIG. 1.

Figure 2D:
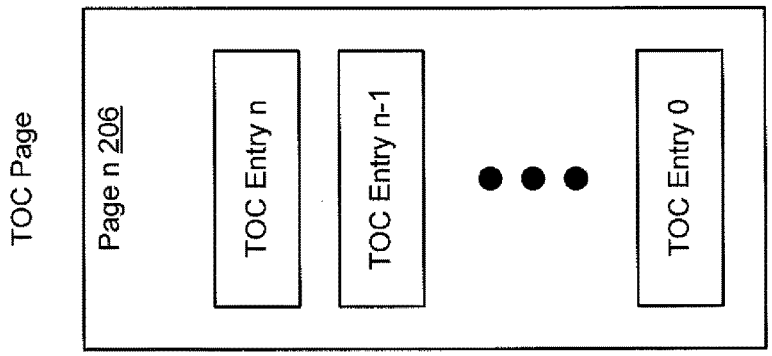
FIG. 2D shows a TOC page in accordance with one or more embodiments of the invention.
Figure 2C:
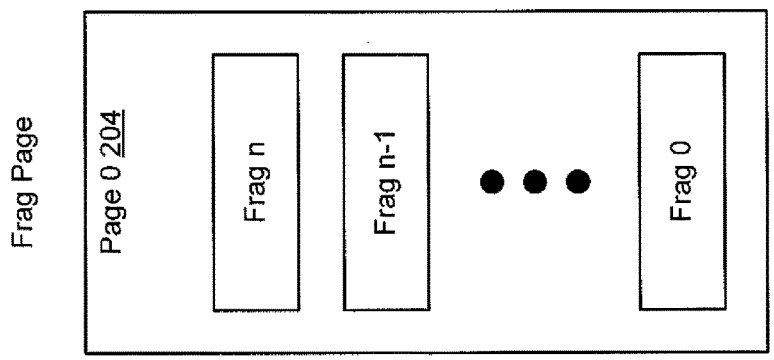
FIG. 2C shows a frag page in accordance with one or more embodiments of the invention.

The following discussion describes embodiments of the invention implemented using solid-state memory devices. Turning to FIG. 2A, FIG. 2A shows a solid-state memory module of a data storage device (not shown) in accordance with one or more embodiments of the invention. The data storage device (not shown) may include multiple solid-state memory modules. The solid-state memory module (200) includes one or more blocks. In one or more embodiments of the invention, a block is the smallest erasable unit of storage within the solid-state memory module (200).

Figure 2B:
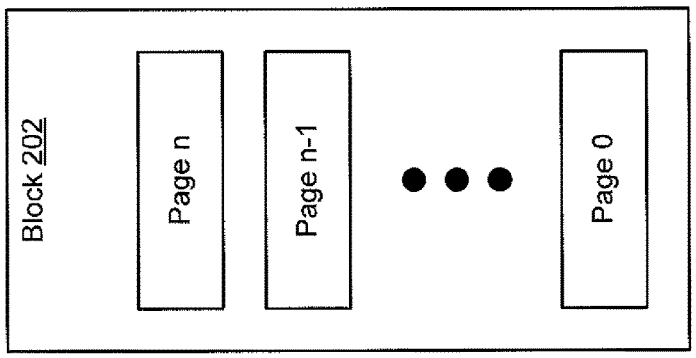
FIG. 2B shows a block in accordance with one or more embodiments of the invention.
Figure 2A:
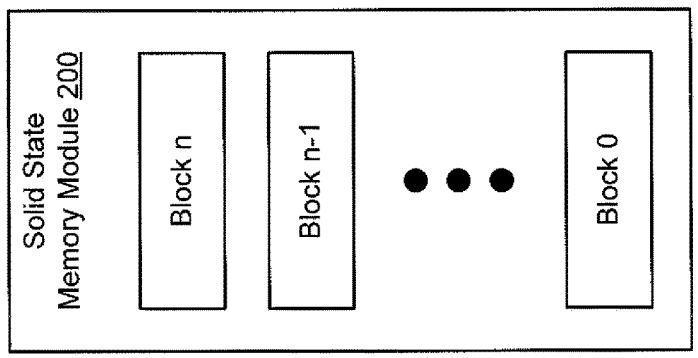
FIG. 2A shows a solid-state memory module in accordance with one or more embodiments of the invention.

FIG. 2B shows a block in accordance with one or more embodiments of the invention. More specifically, each block (202) includes one or more pages. In one or more embodiments of the invention, a page is the smallest addressable unit for read and program operations (including the initial writing to a page) in the solid-state memory module. In one or more embodiments of the invention, each page within a block is either a frag page (see FIG. 2C) or a TOC page (see FIG. 2D).

In one or more embodiments of the invention, rewriting a page within a block requires the entire block to be rewritten. A block has a limited number of program (e.g., write)/erase cycles, where a program/erase cycle includes writing one or more pages to the block then erasing the entire block. Pages in a block may be migrated to another block to maintain a similar number of program/erase cycles across the blocks, referred to as "wear leveling".

In one or more embodiments of the invention, a long-lived block is a block that stores persistent data, where persistent data is data whose longevity outlasts at least one garbage collection cycle. Said another way, data is determined to be persistent data (also referred to as "long-lived data') if the data is associated with a live page (see FIG. 4, 414)). In one or more embodiments of the invention, a garbage collection cycle corresponds to iterating through the blocks to perform a modified garbage collection operation (see FIG. 4) to each block in the storage appliance. In one or more embodiments of the invention, a short-lived block is a block that either stores short-lived data or data that has an unknown longevity. Data that has an unknown longevity is assumed to be short-lived in accordance with one or more embodiments of the invention. In one or more embodiments of the invention, short-lived data in short-lived blocks are stored separately from persistent data in long-lived blocks. In one or more embodiments of the invention, short-lived data are likely to be outdated or obsolete (i.e., no longer in use) prior to the end of a garbage collection cycle. Said another way, short-lived data is data that is not likely migrated in a modified garbage collection operation (see FIG. 4) because the data is dead (e.g., outdated, obsolete, etc.). Alternatively, while data with unknown longevity is assumed to be short-lived, it is also possible that the data is long-lived data (e.g., the data with unknown longevity would be considered long-lived data if it located in a live page during the garbage collection process, see e.g., FIG. 4, step 414).

FIG. 2C shows a frag page in accordance with one or more embodiments of the invention. In one or more embodiments of the invention, the frag page (204) includes one or more frags. In one or more embodiments of the invention, a frag corresponds to a finite amount of user data (e.g., data provided by the client for storage in the storage appliance). Further, the frags within a given page may be of a uniform size or of a non-uniform size. Further, frags within a given block may be of a uniform size or of a non-uniform size. In one or more embodiments of the invention, a given frag may be less than the size of a page, may be exactly the size of a page, or may extend over one or more pages. In one or more embodiments of the invention, a frag page only includes frags. In one or more embodiments of the invention, each frag includes user data.

FIG. 2D shows a TOC page in accordance with one or more embodiments of the invention. In one or more embodiments of the invention, the TOC page (206) includes one or more TOC entries, where each of the TOC entries includes metadata for a given frag. In addition, the TOC page (206) may include a reference to another TOC page in the block (202). In one or more embodiments of the invention, a TOC page only includes TOC entries (and, optionally, a reference to another TOC page in the block), but does not include any frags. In one or more embodiments of the invention, each TOC entry corresponds to a frag (see FIG. 2C) in the block (202). The TOC entries only correspond to frags within the block. Said another way, the TOC page is associated with a block and only includes TOC entries for frags in that block. In one or more embodiments of the invention, the last page that is not defective in each block within each of the solid-state memory modules is a TOC page.

Figure 2E:
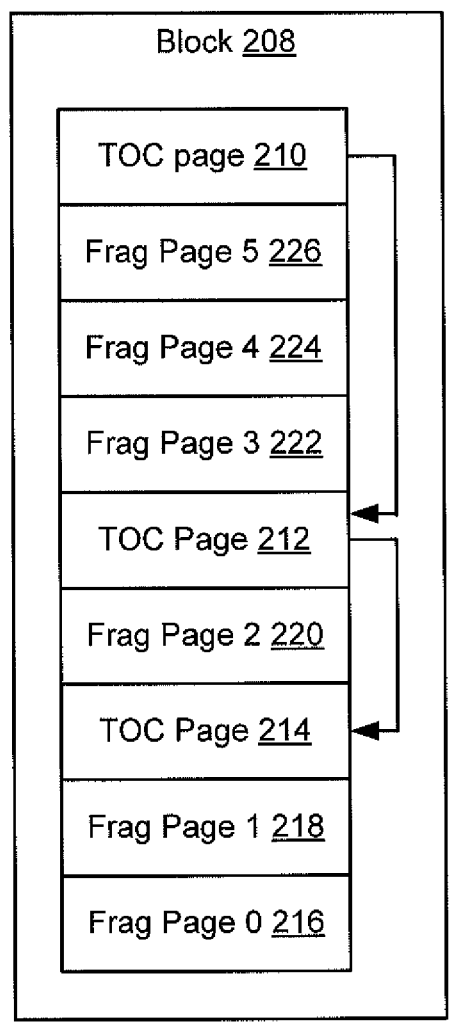
FIG. 2E shows an example of a block in accordance with one or more embodiments of the invention.

FIG. 2E shows an example of a block in accordance with one or more embodiments of the invention. More specifically, FIG. 2E shows a block (208) that includes TOC pages (210, 212, 214) and frag pages (216, 218, 220, 222, 224, 226). In one or more embodiments of the invention, the block (208) is conceptually filled from "bottom" to "top." Further, TOC pages are generated and stored once the accumulated size of the TOC entries for the frags in the frag pages equal the size of a page. Turning to FIG. 2E, for example, frag page 0 (216) and frag page 1 (218) are stored in the block (208). The corresponding TOC entries (not shown) for the frags (not shown) in frag page 0 (216) and frag page 1 (218) have a total cumulative size equal to the size of a page in the block. Accordingly, a TOC page (214) is generated (using the TOC entries corresponding to frags in the block) and stored in the block (208). Frag page 2 (220) is subsequently written to the block (208). Because the TOC entries corresponding to the frags (not shown) in frag page 2 (220) have a total cumulative size equal to the size of a page in the block, TOC page (212) is created and stored in the block (208). Further, because there is already a TOC page in the block (208), TOC page (212) also includes a reference to TOC page (214).

This process is repeated until there is only one page remaining in the block (208) to fill. At this point, a TOC page (210) is created and stored in the last page of the block (208). Those skilled in the art will appreciate that the total cumulative size of the TOC entries in the TOC page (210) may be less than the size of the page. In such cases, the TOC page may include padding to address the difference between the cumulative size of the TOC entries and the page size. Finally, because there are other TOC pages in the block (208), TOC page (210) includes a reference to one other TOC page (212).

As shown in FIG. 2E, the TOC pages are linked from the "top" of the block to "bottom" of the page, such that the TOC page may be obtained by following a reference from a TOC page that is "above" the TOC page. For example, TOC page (212) may be accessed using the reference in TOC page (210).

Those skilled in the art will appreciate that while block (208) only includes frag pages and TOC pages, block (208) may include pages (e.g., a page that includes parity data) other than frag pages and TOC pages without departing from the invention. Such other pages may be located within the block and, depending on the implementation, interleaved between the TOC pages and the frag pages.

Figure 2F:
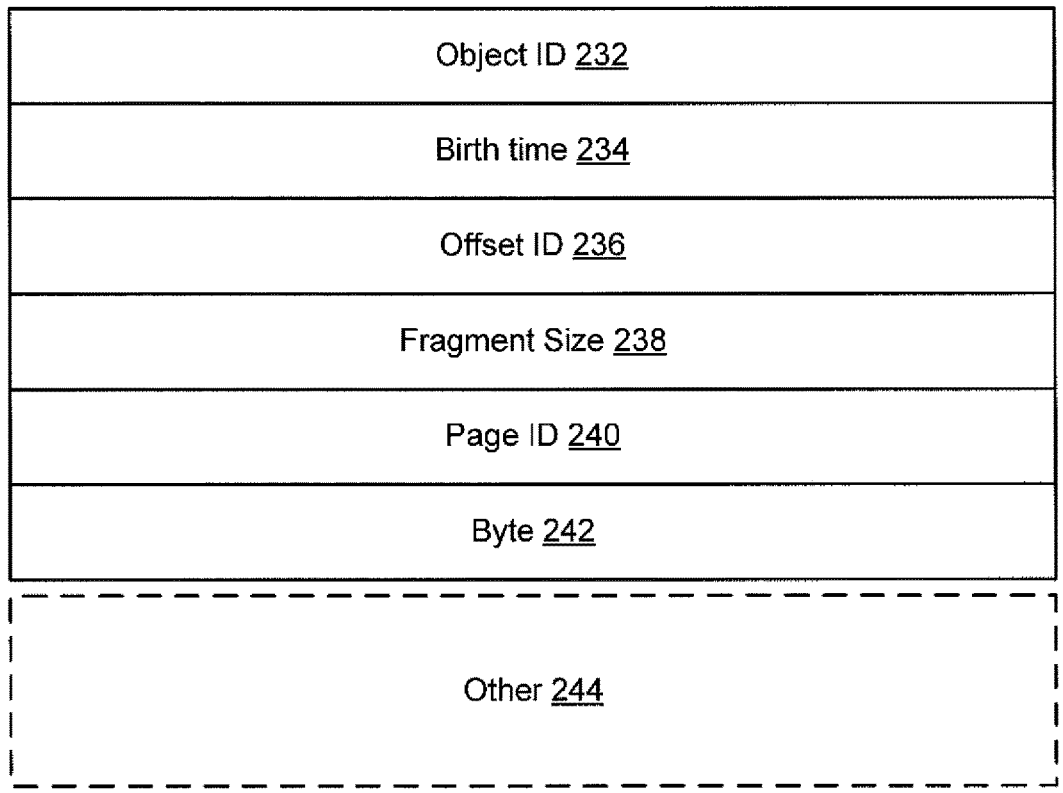
FIG. 2F shows a table of contents (TOC) entry in accordance with one or more embodiments of the invention.

FIG. 2F shows a TOC entry in accordance with one or more embodiments of the invention. In one or more embodiments of the invention, each TOC entry (230) includes metadata for a frag and may include one or more of the following fields: (i) object ID (232), which identifies the object being stored; (ii) the birth time (234), which specifies the time (e.g., the processor clock value of the processor in the control module) at which the frag corresponding to the TOC entry was written to a solid state memory module; (iii) offset ID (236), which identifies a point in the object relative to the beginning of the object (identified by the object ID); (iv) fragment size (238), which specifies the size of the frag; (v) page ID (240), which identifies the page in the block in which the frag is stored; and (vi) byte (242), which identifies the starting location of the frag in the page (identified by the page ID). The TOC entry (230) may include other fields (denoted by other (248)) without departing from the invention.

Those skilled in the art will appreciate that the TOC entry may include additional or fewer fields than shown in FIG. 2F without departing from the invention. Further, the fields in the TOC entry may be arranged in a different order and/or combined without departing from the invention. In addition, while the fields in the TOC entry shown in FIG. 2F appear to all be of the same size, the size of various fields in the TOC entry may be non-uniform, with the size of any given field varying based on the implementation of the TOC entry.

Turning to the flowcharts, while the various steps in the flowchart are presented and described sequentially, one of ordinary skill will appreciate that some or all of the steps may be executed in different orders, may be combined or omitted, and some or all of the steps may be executed in parallel. In one or more embodiments of the invention, one or more steps shown in FIGS. 3 and 4 may be performed in parallel with one or more of the other steps shown in FIGS. 3 and 4. More specifically, write requests received in FIG. 3 and a modified garbage collection operation in FIG. 4 may occur in parallel. Therefore, sorting data within the storage appliance based on longevity of the data may result in potentially coalescing data from write requests (if known to be persistent data) and migrated data from the modified garbage collection operation in accordance with one or more embodiments of the invention.

Figure 3:
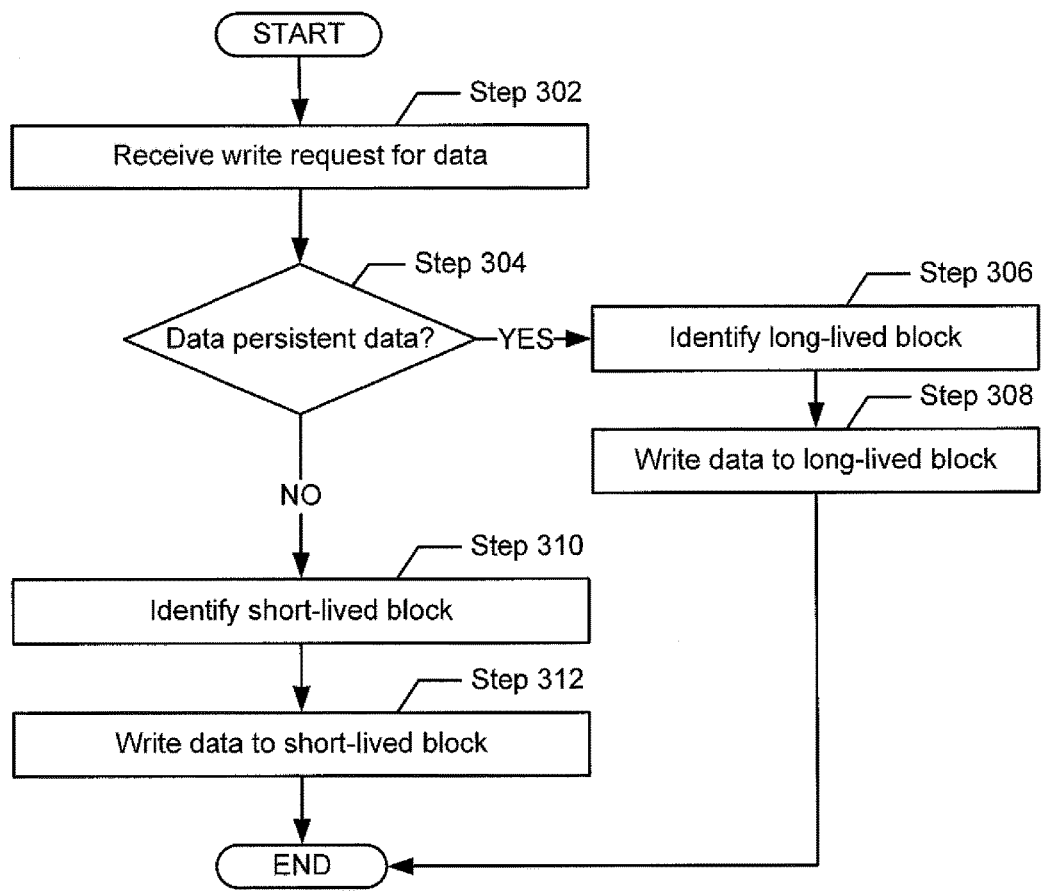
FIG. 3 shows a flowchart for receiving a write request in accordance with one or more embodiments of the invention.

Turning to FIG. 3, FIG. 3 shows a flowchart for receiving a write request in accordance with one or more embodiments of the invention.

In Step 302, a write request to write data to the storage appliance is received from a client. The request may include the data to be stored or may include a reference to the data to be stored. The request may take any form without departing from the invention.

In Step 304, a determination is made about whether the data is persistent data. In one or more embodiments of the invention, determining that data is persistent data may be done via an application programming interface (API) that communicates the data is persistent to the storage appliance. For example, a tag or bits may be added to the write request or to the data itself that the storage appliance recognizes as persistent. Communicating that data is persistent to the storage appliance may involve other methods without departing from the invention.

If a determination is made that the data is persistent data, the method may proceed to Step 306. In Step 306, a long-lived block is identified. In one or more embodiments of the invention, any free or empty block may be selected as a long-lived block. Additionally or alternatively, a block whose program/erase cycle is above a certain threshold may be selected as a long-lived block for wear leveling the blocks. In this case, persistent data written to the long-lived block has a high likelihood of remaining in the block thereby reducing the program/erase cycles of the long-lived block. Alternate methods to select a long-lived block may be used without departing from the invention.

In Step 308, the data is written to the long-lived block. In one or more embodiments of the invention, data is stored as a frag (typically as part of a frag page) in the long-lived block. A TOC entry is generated and stored for the frag (typically as part of a TOC page) in the long-lived block.

Returning to Step 304, if a determination is made that the data is not persistent data, the method may proceed to Step 310. In one or more embodiments of the invention, if the data is not persistent data, either the data is known as short-lived (e.g., via an API) or the data has an unknown longevity. The data is stored separately in a short-lived block from the persistent data in the long-lived block in accordance with one or more embodiments of the invention. Said another way, there is no overlap between persistent data in the long-lived block and data in the short-lived block. In Step 310, a short-lived block is identified. In one or more embodiments of the invention, any free or empty block may be selected as a short-lived block. Additionally or alternatively, a block whose program/erase cycle is below a certain threshold may be selected as a short-lived block for wear leveling the blocks. In this case, data written to the short-lived block has a high likelihood of being erased thereby increasing the program/erase cycles of the short-lived block. Alternate methods to select a short-lived block may be used without departing from the invention.

In Step 312, data is written to a short-lived block. In one or more embodiments of the invention, data is stored as a frag (typically as part of a frag page) in the short-lived block. A TOC entry is generated and stored for the frag (typically as part of a TOC page) in the short-lived block.

Figure 4:
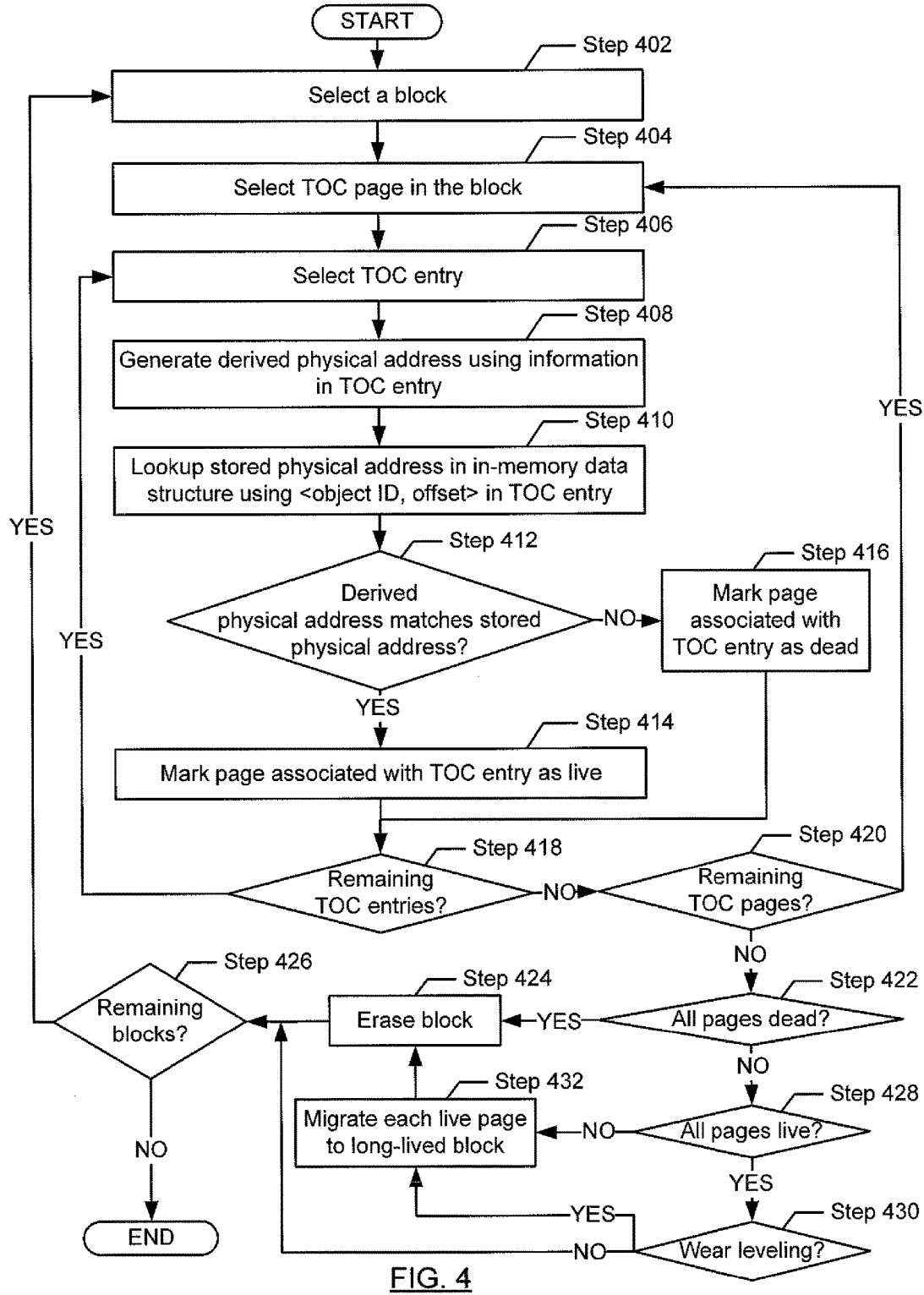
FIG. 4 shows a flowchart for a modified garbage collection operation in accordance with one or more embodiments of the invention.

Turning to FIG. 4, FIG. 4 shows a flowchart for a modified garbage collection operation in accordance with one or more embodiments of the invention. As described above, the modified garbage collection operation may occur in parallel to write requests received by the storage appliance.

In Step 402, a block in the storage appliance is selected. In Step 404, a TOC page in the block is selected. In Step 406, a TOC entry in the TOC page in the block is selected.

In Step 408, a derived physical address using information in the TOC entry is generated. In one or more embodiments of the invention, the derived physical address for a frag is defined as the following n-tuple: <storage module, channel, chip enable, LUN, plane, block, page ID, byte>, where the page ID and byte are stored in the TOC entry and the remaining data in the n-tuple may be derived from the page ID and byte.

In Step 410, a stored physical address in an in-memory data structure is looked up using an n-tuple <object ID, offset ID> in the TOC entry. In one or more embodiments of the invention, an in-memory data structure includes a mapping between an n-tuple (e.g., <object ID, offset ID>, <object ID, offset ID, birth time>) and a stored physical address of the frag.

In Step 412, a determination is made about whether the derived physical address matches the stored physical address. In one or more embodiments of the invention, the derived physical address matches the stored physical address if the frag associated with the TOC entry is live (e.g., up to date, in use). In one or more embodiments of the invention, the derived physical address does not match the stored physical address if the frag associated with the TOC entry is dead (e.g., no longer in use, outdated, obsolete). If a determination is made that the derived physical address matches the stored physical address, the method may proceed to Step 414; otherwise the method may proceed to Step 416. In Step 414, the frag associated with the TOC entry is marked as live. For example, one or more bits may be associated with the frag to mark the frag as live.

In Step 416, the frag associated with the TOC entry is marked as dead. For example, one or more bits may be associated with the frag to mark the frag as dead.

In Step 418, a determination is made about whether there are remaining TOC entries in the TOC page. In one or more embodiments of the invention, the TOC pages includes one or more TOC entries. If a determination is made that there are remaining TOC entries in the TOC page, the method may return to Step 406 discussed above; otherwise the method may proceed to Step 420.

In Step 420, a determination is made about whether there are remaining TOC pages in the block. In one or more embodiments of the invention, there may be one or more TOC pages in the block. If a determination is made that there are remaining TOC pages in the block, the method may return to Step 404 discussed above; otherwise the method may proceed to Step 422. In Step 422, a determination is made about whether all the pages in the block are marked as dead. If a determination is made that all the pages in the block are marked as dead, the method may proceed to Step 424; otherwise the method may proceed to Step 428. In Step 424, the block is erased because no migration of data is required.

In Step 426, a determination is made about whether there are remaining blocks in a solid state memory module. In one or more embodiments of the invention, a solid state memory module includes one or more blocks. If a determination is made that there are remaining blocks in the solid state memory module, the method may return to Step 402 discussed above.

In Step 428, a determination is made about whether all pages in the block are marked as live. If a determination is made that all pages in the block are marked as live, the method may proceed to Step 430; otherwise the method may proceed to Step 432. In Step 430, a determination is made about whether wear leveling is required. As described above, wear leveling balances the number of program/erase cycles across the blocks in a solid state memory module. In one or more embodiments of the invention, wear leveling may be required if the block has a program/erase cycle value below a threshold. Said another way, the block may require a program/erase cycle to prevent another block with a higher program/erase cycle from increasing their program/erase cycle value. If a determination is made that wear leveling is required, the method may proceed to Step 432; otherwise the method may return to Step 426.

In Step 432, each live page is migrated to a long-lived block. In one or more embodiments of the invention, each live page is considered persistent data because each live page outlasted at least one garbage collection cycle. In one or more embodiments of the invention, any free or empty block may be selected as a long-lived block. Additionally or alternatively, a block whose program/erase cycle is above a certain threshold may be selected as a long-lived block for wear leveling the blocks. In this case, persistent data written to the long-lived block should remain in the block reducing the program/erase cycles of the long-lived block. Alternate methods to select a long-lived block may be used without departing from the invention. In one or more embodiments of the invention, data is rewritten as a frag (typically as part of a frag page) in the long-lived block. A TOC entry is generated and stored for the frag (typically as part of a TOC page) in the long-lived block. The method may then return to Step 424 discussed above.

Figure 5A:
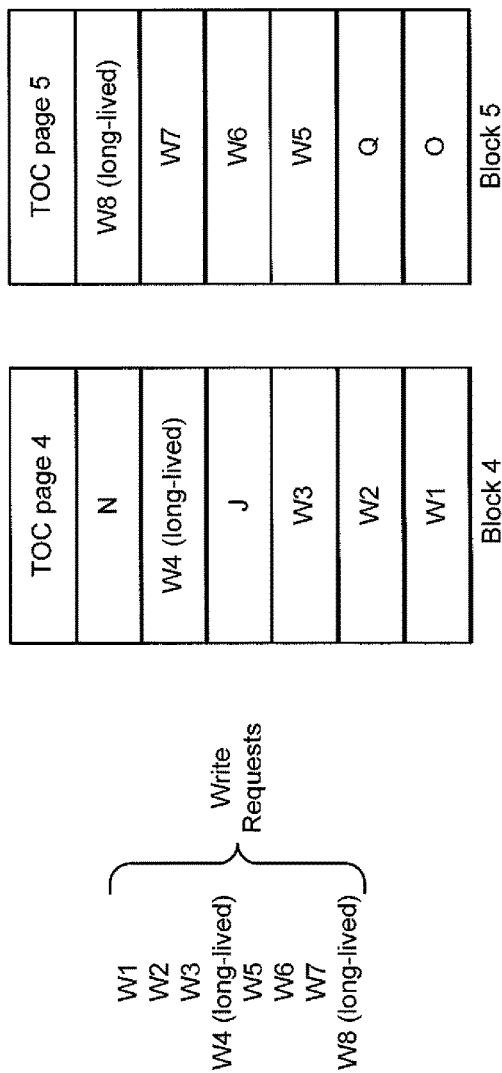
FIGS. 5A-6B show various examples in accordance with one or more embodiments of the invention.
Figure 5A:
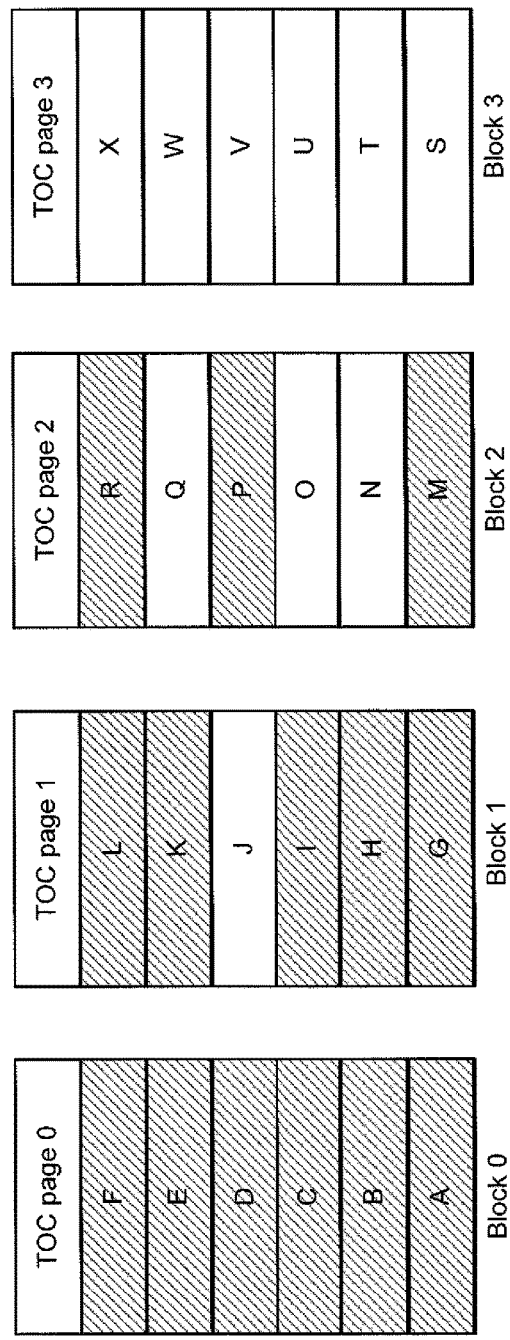
Figure 5B:
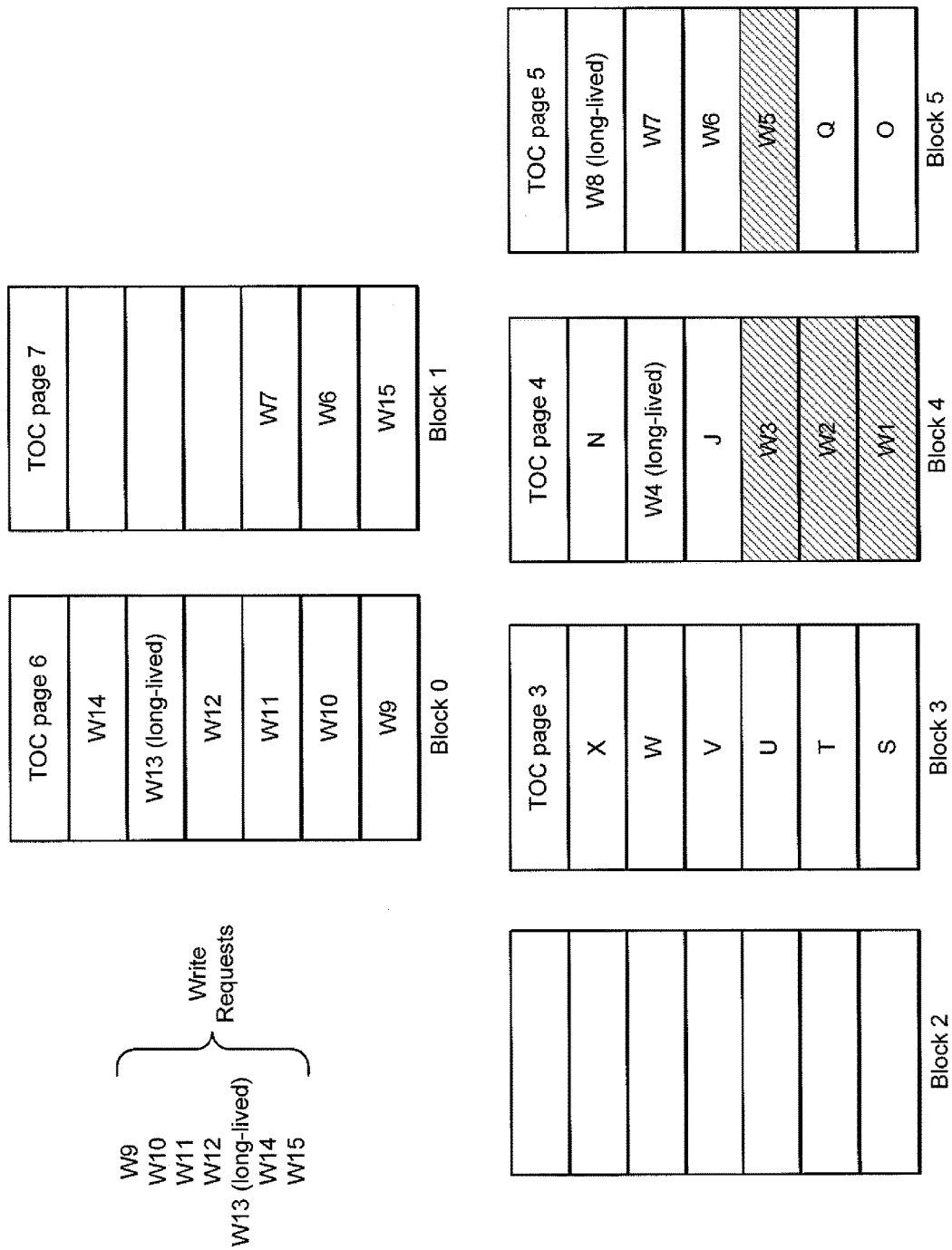
Figure 6A:
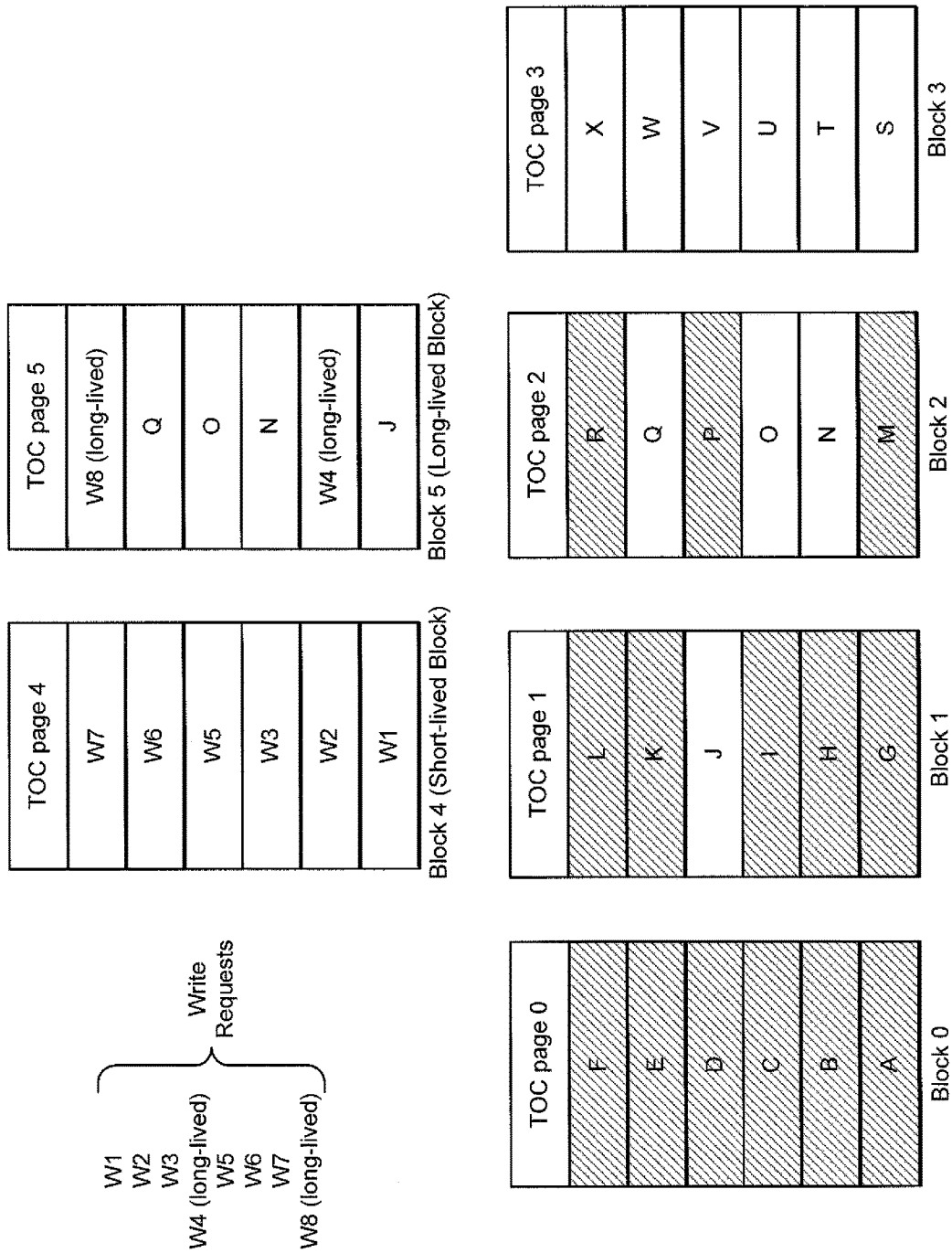
Figure 6B:
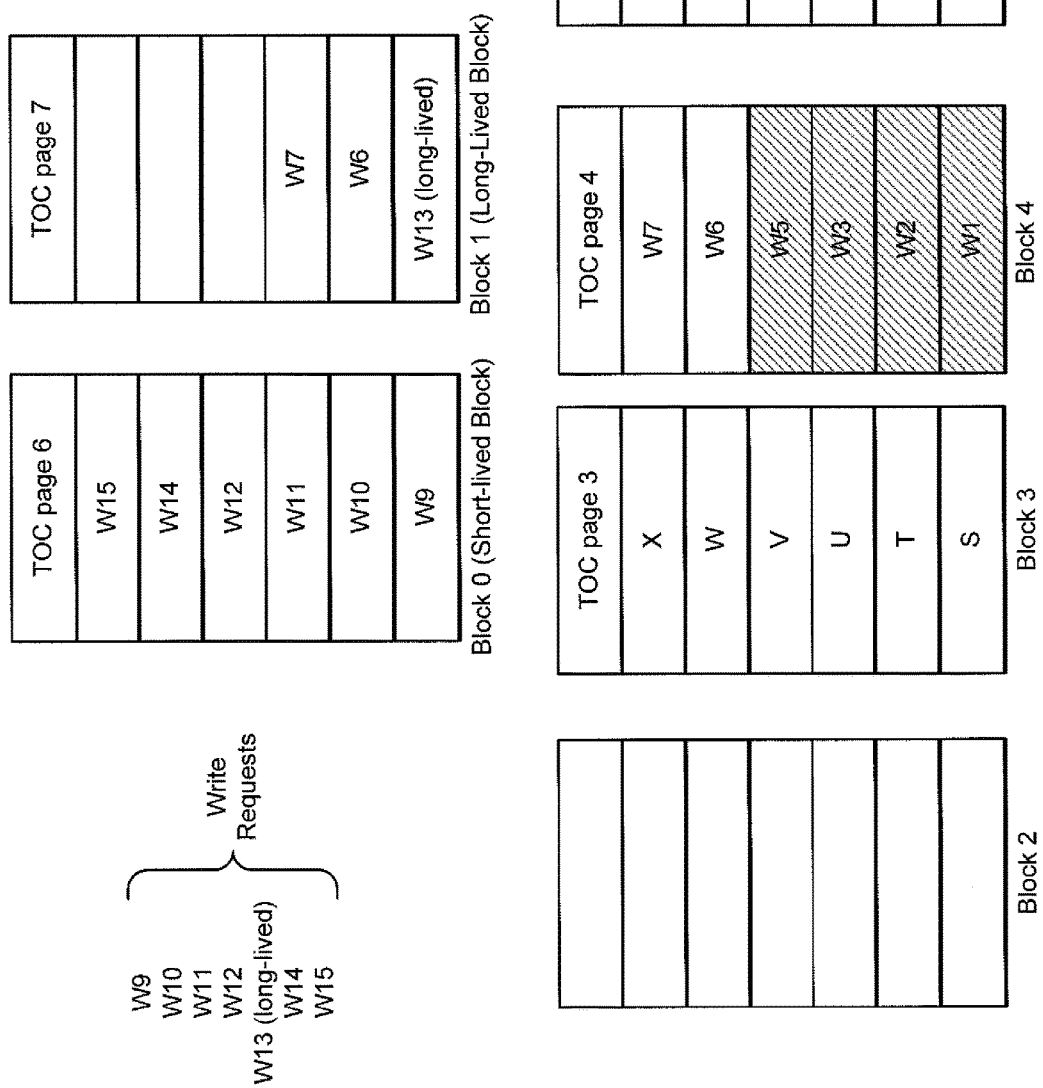

FIGS. 5A-6B show various examples in accordance with one or more embodiments of the invention. The examples are not intended to limit the scope of the invention. FIGS. 5A and 5B show an example of the traditional servicing write requests and traditional garbage collection operations. FIGS. 6A and 6B show an example of data migration given a modified garbage collection operation in accordance with one or more embodiments of the invention. For the purposes of performance comparison, the conditions in FIGS. 5A and 5B (e.g., number of write requests received, timing of write requests, contents of certain blocks) are the same as the conditions in FIGS. 6A and 6B

Referring to FIG. 5A, consider a scenario in which a first iteration of garbage collection occurs on block 0, block 1, block 2, and block 3 in parallel to receiving write requests W1, W2, W4, W5, W6, W7, and W8, where data written in W4 and W8 are persistent data. Block 4 and Block 5 are empty and available to write any migrated data or data from write requests.

Garbage collection operation occurs first on block 0 in parallel to receiving write requests W1, W2, and W3. Block 0 is erased because each page in block 0 is marked as dead. Block 4 is selected randomly to write data from write requests W1, W2, and W3. Additionally, TOC entries associated with W1, W2, and W3, respectively, are generated and stored as part of TOC page 4 in block 4.

Garbage collection is then performed on block 1. The only live page that requires migration in block 1 is page J. Block 4 is randomly selected for migration of page J. Additionally, a TOC entry associated with page J is generated and stored as part of TOC page 4 in block 4. After the migration of page J, block 1 is erased. Write request W4 is then received. Block 4 is randomly selected to write the data associated with W4. Additionally, a TOC entry associated with W4 is generated and stored as part of TOC page 4 in block 4.

Garbage collection then occurs on block 2 in parallel to receiving write requests W5, W6, and W7. Pages Q, O, and N are the live pages in block 2 that require migration. Pages Q and O and data associated with W5, W6, and W7 are randomly selected to migrate to block 5. Additionally, TOC entries associated with Q, O, W5, W6, and W7, respectively, are generated and stored as part of TOC page 5 in block 5. Page N is randomly selected to migrate to block 4. A TOC entry associated with N is generated and stored as part of TOC page 4 in block 4. After the migration of pages Q, O, and N, Block 2 is erased.

Finally, garbage collection occurs at block 3 in parallel to receiving write request W8. All pages are live in block 3. Wear leveling of block 3 is not required and so no migration occurs in block 3. W8 is randomly selected to write to block 5. Additionally, a TOC entry associated with W8 is generated and stored as part of TOC page 5 in block 5.

The garbage collection operation has cycled through each of the blocks (i.e., block 0, block 1, block 2, and block 3) to migrate any live pages to either block 4 or block 5. Further, the write requests received in parallel to garbage collection are allocated to either block 4 or block 5. Given a total of eight write requests, four migrations are required in the first iteration.

Referring to FIG. 5B, consider a scenario in which a second iteration of garbage collection occurs after the first iteration discussed in FIG. 5A. The second iteration of the garbage collection occurs on block 2, block 3, block 4, and block 5 in parallel to receiving write requests W9, W10, W11, W12, W13, W14, and W15, where W13 is long-lived or persistent data. Block 0 and Block 1 are erased after the first iteration in FIG. 5B and available to write any migrated data or data from write requests.

Garbage collection starts at block 2 in parallel to receiving write requests W9, W10, W11, and W12. Block 2 was erased in the first iteration (see FIG. 5A) and does not include any pages to migrate. Block 0 is randomly selected to write the data associated with write requests W9, W10, W11, and W12. Additionally, TOC entries associated with W9, W10, W11, and W12, respectively, are generated and stored as part of TOC page 6 in block 0.

Garbage collection then occurs at block 3 in parallel to receiving write request W13. All pages that were live in block 3 in the first iteration (see FIG. 5A) remain live. As discussed above in FIG. 5A, wear leveling of block 3 is not required and so once again no migration occurs in block 3. Block 0 is randomly selected to write the data associated with W13. Additionally, a TOC entry associated with W13 is generated and stored as part of TOC page 6 in block 0.

Garbage collection is then performed on block 4 in parallel to receiving write requests W14 and W15. Pages W6 and W7 are the live pages in block 4 that require migration. Block 1 is selected at random to write data associated with W15 in parallel to writing pages W6 and W7. Additionally, TOC entries associated with W15, W6, and W7, respectively, are generated and stored as part of TOC page 7 in block 1. Block 0 is selected at random to write data associated with W14. A TOC entry associated with W14 is also generated and stored as part of TOC page 6 in block 0. After the migration of pages W6 and W7, Block 4 is erased.

Finally, garbage collection occurs at block 5. All pages are live in block 5. Wear leveling of block 5 is not required and so no migration occurs in block 5.

Garbage collection has cycled through each of the blocks (i.e., block 2, block 3, block 4, and block 5) to migrate any live pages to either block 0 or block 1. Further, the write requests received in parallel to the modified garbage collection operation are allocated to either block 0 or block 1. Given a total of seven write requests, eight migrations are required in the second iteration. Over the two iterations, there are 12 migrations for 15 data writes. The write amplitude may then be calculated as 1 write+(12 migrations/15 writes)=1.8. Said another way, for every write 0.8 additional writes are required.

Referring to FIG. 6A, consider a scenario in which a first iteration of a modified garbage collection operation occurs on block 0, block 1, block 2, and block 3 in parallel to receiving write requests W1, W2, W4, W5, W6, W7, and W8, where data written in W4 and W8 are persistent data. Block 4 is selected as a short-lived block and block 5 is selected as a long-lived block.

A modified garbage collection operation occurs first on block 0 in parallel to receiving write requests W1, W2, and W3. Block 0 is erased because each page in block 0 is marked as dead. Longevity of W1, W2, and W3 are unknown. Therefore, W1, W2, and W3 are written to block 4 (short-lived block). Additionally, TOC entries associated with W1, W2, and W3, respectively, are generated and stored as part of TOC page 4 in block 4 (short-lived block).

The modified garbage collection operation is then performed on block 1. The only live page that requires migration in block 1 is page J. Because page J survives or outlasts garbage collection, page J is likely persistent data. Page J is then migrated to block 5 (long-lived block). Additionally, a TOC entry associated with page J is generated and stored as part of TOC page 5 in block 5 (long-lived block). After the migration of page J, block 1 is erased. Write request W4 is then received. W4 is communicated as including persistent data through an application programming interface (API). W4 is then written to block 5 (long-lived block) rather than block 4 (short-lived block) that is reserved for write requests with unknown longevity. Additionally, a TOC entry associated with W4 is generated and stored as part of TOC page 5 in block 5 (long-lived block).

The modified garbage collection operation then occurs on block 2 in parallel to receiving write requests W5, W6, and W7. Pages Q, O, and N are the live pages in block 2 that require migration. Once again, since pages Q, O, and N are live when the garbage collection occurs, pages Q, O, and N are likely persistent data. Longevity of data associated with write requests W5, W6, and W7 are unknown and likely short-lived. Pages Q, O, and N are then migrated to block 5 (long-lived block) in parallel to writing W5, W6, and W7 to block 4 (short-lived block). Additionally, TOC entries associated with W5, W6, and W7, respectively, are generated and stored as part of TOC page 4 in block 4 (short-lived block). TOC entries associated with pages Q, O, and N, respectively, are also generated and stored as part of TOC page 5 in block 5 (long-lived block). After the migration of pages Q, O, and N, Block 2 is erased.

Finally, the modified garbage collection operation occurs at block 3 in parallel to receiving write request W8. All pages are live in block 3. Wear leveling of block 3 is not required and so no migration occurs in block 3. Similarly to write request W4, write request W8 communicates through the API that W8 includes persistent data. W8 is then written to block 5 (long-lived block). Additionally, a TOC entry associated with W8 is generated and stored as part of TOC page 5 in block 5 (long-lived block).

The modified garbage collection operation has cycled through each of the blocks (i.e., block 0, block 1, block 2, and block 3) to migrate any live pages to block 5 (long-lived block). Further, the write requests received in parallel to the modified garbage collection are allocated to block 5 (long-lived block) if the write request is known to include persistent data (e.g. W4, W8). Otherwise, the write requests are allocated to block 4 (short-lived block). Given a total of eight write requests, four migrations are required in the first iteration.

Referring to FIG. 6B, consider a scenario in which a second iteration of a modified garbage collection operation occurs after the first iteration discussed in FIG. 6A. The second iteration of the modified garbage collection operation occurs on block 2, block 3, block 4, and block 5 in parallel to receiving write requests W9, W10, W11, W12, W13, W14, and W15, where W13 is long-lived or persistent data. Block 0 that was erased in the first iteration (see FIG. 6A) is selected as a short-lived block. Block 1 that was erased in the first iteration (see FIG. 6A) is selected as a long-lived block.

The modified garbage collection operation starts at block 2 in parallel to receiving write requests W9, W10, W11, and W12. Block 2 was erased in the first iteration (see FIG. 5A) and does not include any pages to migrate. Longevity of W9, W10, W11, and W12 are unknown. Therefore, W9, W10, W11, and W12 are written to block 0 (short-lived block). Additionally, TOC entries associated with W9, W10, W11, and W12, respectively, are generated and stored as part of TOC page 6 in block 0 (short-lived block).

The modified garbage collection operation then occurs at block 3 in parallel to receiving write request W13. All pages that were live in block 3 in the first iteration (see FIG. 6A) remain live. As discussed above in FIG. 6A, wear leveling of block 3 is not required and so once again no migration occurs in block 3. Write request W13 is communicated as including persistent data through an API. W13 is written to block 1 (long-lived block) rather than block 0 (short-lived block) that is reserved for write requests with unknown longevity or known to be short-lived. Additionally, a TOC entry associated with W13 is generated and stored as part of TOC page 7 in block 1 (long-lived block).

The modified garbage collection is then performed on block 4 in parallel to receiving write requests W14 and W15. Both write requests W14 and W15 have data with unknown longevity and are likely short-lived. Pages W6 and W7 are the live pages in block 4 that require migration. Because pages W6 and W7 are live when the garbage collection occurs, pages W6 and W7 are likely persistent data. Pages W6 and W7 are then migrated to block 1 (long-lived block) in parallel to writing W14 and W15 to block 0 (short-lived block). Additionally, TOC entries associated with W6 and W7, respectively, are generated and stored as part of TOC page 7 in block 1 (long-lived block). TOC entries associated with W14 and W15, respectively, are also generated and stored as part of TOC page 6 in block 0 (short-lived block). After the migration of pages W6 and W7, Block 4 is erased.

Finally, the modified garbage collection operation occurs at block 5. All pages are live in block 5. Wear leveling of block 5 is not required and so no migration occurs in block 5.

The modified garbage collection operation has cycled through each of the blocks (i.e., block 2, block 3, block 4, and block 5) to migrate any live pages to block 1 (long-lived block). Further, the write requests received in parallel to the modified garbage collection operation are allocated to block 1 (long-lived block) if the write request is known to include persistent data (e.g., W13). Otherwise, the write requests are allocated to block 0 (short-lived block).

Given a total of seven write requests, two migrations are required in the second iteration. Over the two iterations, there are 6 migrations for 15 data writes. The write amplitude may then be calculated as 1 write+(6 migrations/15 writes)=1.4. Said another way, for every write 0.4 additional writes are required. The write amplitude of 1.4 achieved by sorting data based on longevity during a modified garbage collection operation while receiving write requests is an improvement to the write amplitude of 1.8 achieved by ignoring longevity of data during traditional garbage collection while receiving write requests.

One or more embodiments of the invention provide a system and method in which data stored in the storage appliance are sorted based on longevity of the data. In this manner, all data known as persistent data are stored in long-lived blocks, while short-lived data or data with unknown longevity are stored in short-lived blocks. By arranging the data according to the various embodiments of the invention, the storage appliance improves performance of a given solid state memory module (or a subset thereof) by decreasing data migration during garbage collection. By decreasing data migration during garbage collection, write amplitude in the storage appliance may be minimized in accordance with one or more embodiments of the invention. Minimizing the write amplitude may result in a fewer number of program/erase cycles of a solid state memory module because of decreased data migration for each write. Because the number of program/erase cycles reduces the lifetime of a solid state memory module, there is a performance gain by minimizing the write amplitude.

Further, embodiments of the invention enable the creation of an in-memory data structure, which allows the storage appliance to access data in a single look-up step. Said another way, the storage appliance may use the in-memory data structure to directly ascertain the physical address(es) of the data in the storage appliance. Using this information, the storage appliance is able to directly access the data and does not need to traverse any intermediate metadata hierarchy in order to obtain the data.

One or more embodiments of the invention may be implemented using instructions executed by one or more processors in the system. Further, such instructions may corresponds to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium (CRM) comprising instructions, which when executed by a processor perform a method, the method comprising:
   selecting a frag page of a block stored on a persistent storage;
   generating a derived physical address using a TOC entry associated with the frag page;
   selecting a stored physical address based on an object ID and an offset ID, wherein the object ID and the offset ID are located in the TOC entry;
   making a determination, that the derived physical address matches the stored physical address; and
   in response to the determination, migrating the frag page to a second block stored on the persistent storage.

2. The non-transitory CRM of claim 1, wherein the method further comprises:
   selecting a second frag page of the block stored on the persistent storage;
   generating a second derived physical address using a second TOC entry associated with the second frag page;
   selecting a second stored physical address based on a second object ID and a second offset ID, wherein the second object ID and the second offset ID are located in the second TOC entry;
   making a second determination, that the second derived physical address does not match the second stored physical address; and
   in response to the second determination, deleting the second frag page without migrating the second frag page.

3. The non-transitory CRM of claim 2, wherein the method further comprises:
   while deleting the second frag page, deleting the first frag page.

4. The non-transitory CRM of claim 3, wherein the first frag page and the second frag page are deleted as a block level deletion of the block.

5. The non-transitory CRM of claim 1, wherein the method further comprises:
   selecting a second frag page of the block stored on the persistent storage;
   generating a second derived physical address using a second TOC entry associated with the second frag page;
   selecting a second stored physical address based on a second object ID and a second offset ID, wherein the second object ID and the second offset ID are located in the second TOC entry;
   making a second determination, that the second derived physical address matches the second stored physical address; and
   in response to the second determination, migrating the second frag page to the second block stored on the persistent storage.

6. The non-transitory CRM of claim 5, wherein the method further comprises:
   making a third determination that a first candidate block has a lower wear level than a wear level of a second candidate block; and
   selecting the first candidate block as the second block.

7. The non-transitory CRM of claim 5, wherein the method further comprises:
   making a third determination that a candidate block is empty; and
   selecting the candidate block as the second block.

8. The non-transitory CRM of claim 1, wherein the method further comprises:
   selecting a second frag page of the block stored on the persistent storage;
   generating a second derived physical address using a second TOC entry associated with the second frag page;
   selecting a second stored physical address based on a second object ID and a second offset ID, wherein the second object ID and the second offset ID are located in the second TOC entry;

making a second determination, that the second derived physical address matches the second stored physical address; and in response to the second determination, migrating the second frag page to a third block stored on the persistent storage.

9. A method for managing data, comprising:
selecting a frag page of a block stored on a persistent storage;
generating a derived physical address using a TOC entry associated with the frag page;
selecting a stored physical address based on an object ID and an offset ID, wherein the object ID and the offset ID are located in the TOC entry;
making a determination, that the derived physical address matches the stored physical address; and
in response to the determination, migrating the frag page to a second block stored on the persistent storage.

10. The method of claim 9, further comprising:
selecting a second frag page of the block stored on the persistent storage;
generating a second derived physical address using a second TOC entry associated with the second frag page;
selecting a second stored physical address based on a second object ID and a second offset ID, wherein the second object ID and the second offset ID are located in the second TOC entry;
making a second determination, that the second derived physical address does not match the second stored physical address; and
in response to the second determination, deleting the second frag page without migrating the second frag page.

11. The method of claim 10, wherein the method further comprises:
while deleting the second frag page, deleting the first frag page.

12. The method of claim 11, wherein the first frag page and the second frag page are deleted as a block level deletion of the block.

13. The method of claim 9, further comprising:
selecting a second frag page of the block stored on the persistent storage;
generating a second derived physical address using a second TOC entry associated with the second frag page;
selecting a second stored physical address based on a second object ID and a second offset ID, wherein the second object ID and the second offset ID are located in the second TOC entry;
making a second determination, that the second derived physical address matches the second stored physical address; and
in response to the second determination, migrating the second frag page to the second block stored on the persistent storage.

14. The method of claim 13, further comprising:
making a third determination that a first candidate block has a lower wear level than a wear level of a second candidate block; and
selecting the first candidate block as the second block.

15. The method of claim 13, further comprising:
making a third determination that a candidate block is empty; and
selecting the candidate block as the second block.

16. The method of claim 9, further comprising:
selecting a second frag page of the block stored on the persistent storage;
generating a second derived physical address using a second TOC entry associated with the second frag page;
selecting a second stored physical address based on a second object ID and a second offset ID, wherein the second object ID and the second offset ID are located in the second TOC entry;
making a second determination, that the second derived physical address matches the second stored physical address; and
in response to the second determination, migrating the second frag page to a third block stored on the persistent storage.

17. A storage appliance, comprising:
persistent storage;
a non-transitory computer readable medium comprising instructions;
a processor, configured to execute the instructions, wherein the instructions when executed by the processor perform a method, the method comprising:
selecting a frag page of a block stored on the persistent storage;
generating a derived physical address using a TOC entry associated with the frag page;
selecting a stored physical address based on an object ID and an offset ID, wherein the object ID and the offset ID are located in the TOC entry;
making a determination, that the derived physical address matches the stored physical address; and
in response to the determination, migrating the frag page to a second block stored on the persistent storage.

18. The storage appliance of claim 17, wherein the method further comprises:
selecting a second frag page of the block stored on the persistent storage;
generating a second derived physical address using a second TOC entry associated with the second frag page;
selecting a second stored physical address based on a second object ID and a second offset ID, wherein the second object ID and the second offset ID are located in the second TOC entry;
making a second determination, that the second derived physical address does not match the second stored physical address; and
in response to the second determination, deleting the second frag page without migrating the second frag page.

19. The storage appliance of claim 18, wherein the method further comprises:
while deleting the second frag page, deleting the first frag page.

20. The storage appliance of claim 19, wherein the first frag page and the second frag page are deleted as a block level deletion of the block.

* * * * *